V. G. NELSEN.
POTATO PLANTER.
APPLICATION FILED JAN. 21, 1918.
1,285,327.
Patented Nov. 19, 1918.
2 SHEETS—SHEET 1.
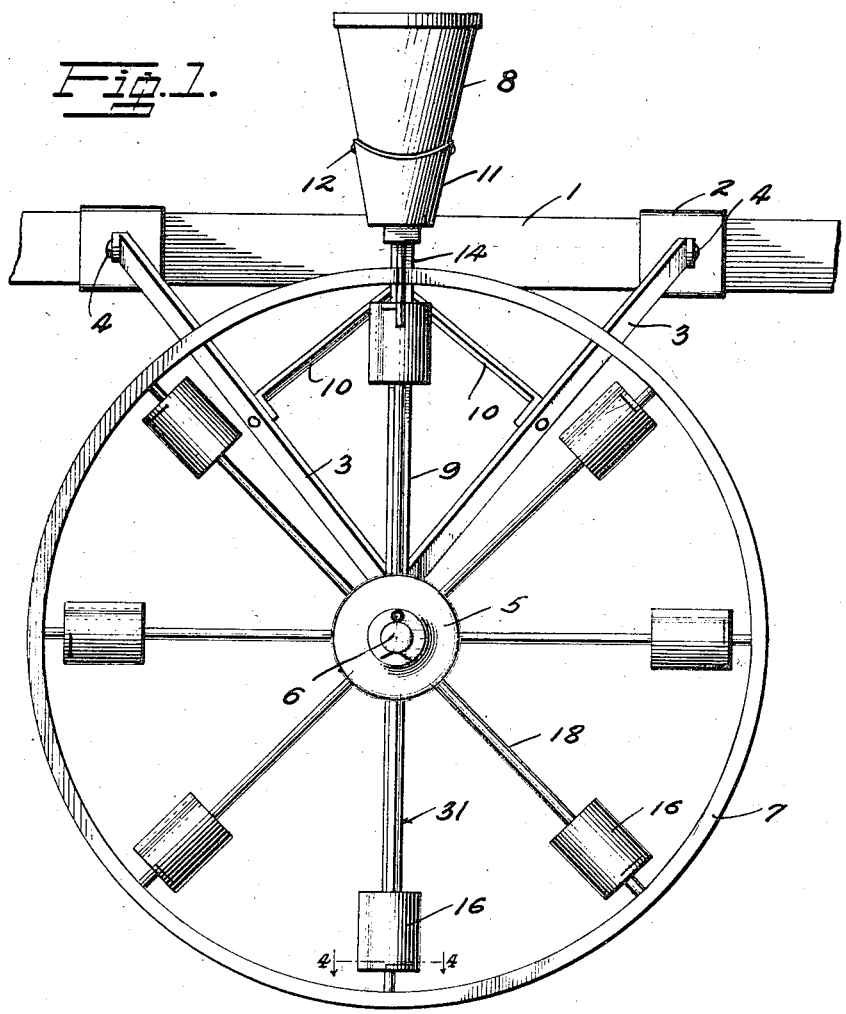
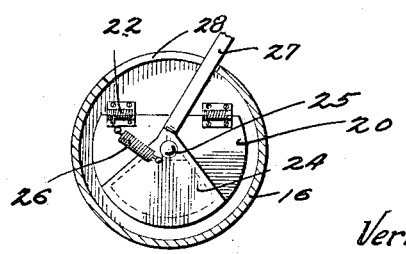
Witnesses
Inventor
Vernon G. Nelsen.
By
Attorney

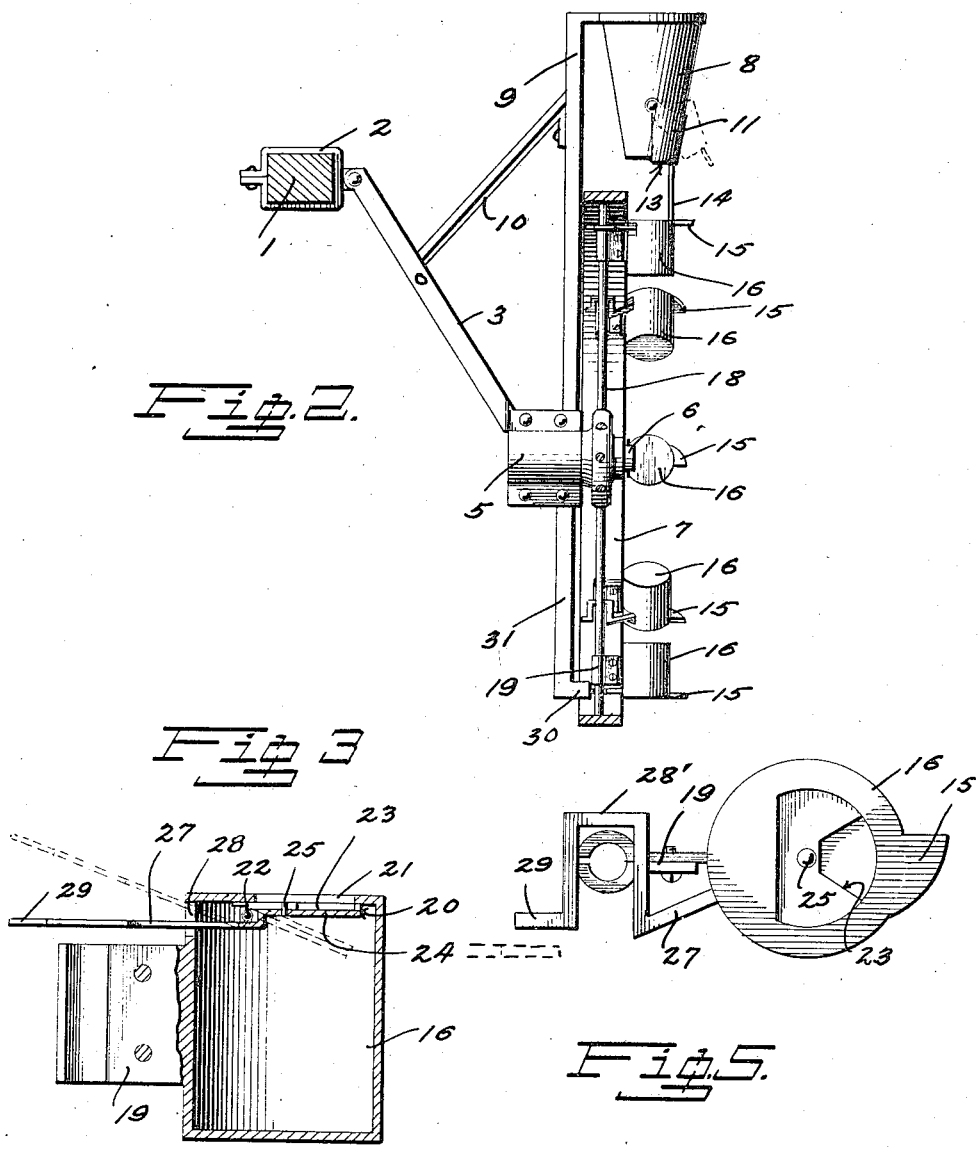

UNITED STATES PATENT OFFICE.

VERNON G. NELSEN, OF STAPLEHURST, NEBRASKA.

POTATO-PLANTER.

1,285,327.　　　　　Specification of Letters Patent.　　Patented Nov. 19, 1918.

Application filed January 21, 1918. Serial No. 213,009.

*To all whom it may concern:*

Be it known that I, VERNON G. NELSEN, a citizen of the United States, residing at Staplehurst, in the county of Seward and State of Nebraska, have invented certain new and useful Improvements in Potato-Planters, of which the following is a specification.

This invention relates to potato planters and has for its object the production of a simple and efficient potato planter which may be attached to the ordinary walking plow in such a manner as to permit the planter wheel to travel in the furrow formed by the plow.

Another object of this invention is the production of a simple and efficient means for facilitating the dropping of the potatoes in the planter cup and also for facilitating the discharge or dropping of the potatoes from the planter cup.

With these and other objects in view this invention consists of certain novel constructions, combinations and arrangements of parts as will be hereinafter fully described and claimed.

In the drawings:

Figure 1 is a side elevation of the planter,

Fig. 2 is a central vertical section therethrough,

Fig. 3 is a vertical section through the planter cup,

Fig. 4 is a transverse section through one of the planter cups,

Fig. 5 is a bottom plan view of the discharge end of one of the planter cups.

By referring to the drawings, it will be seen that 1 designates the plow beam upon which is supported a plurality of planter supporting clamps 2, as shown in Figs. 1 and 2 of the drawings. Planter supporting arms 3 are pivotally secured to the clamps 2, by means of pivot pins 4. The lower ends of these planter supporting arms 3 support a bearing 5 as shown in Fig. 2 and the supporting axle 6 of the planter wheel 7 is journaled within the bearing 5.

A potato supporting receptacle 8 is supported above the wheel 7 upon a vertically extending arm 9, the arm 9 being secured at its lower end to the upper face of the bearing 5. This arm 9 is hingedly braced against laterally swinging movement by means of the inclined braces 10, these braces 10 being secured to the rear face of the supporting arm 9, and to the inner faces of the arms 3 as shown in Figs. 1 and 2 of the drawings. The potato supporting receptacle 8 comprises a tapering body having an open lower end, the open lower end being normally closed by means of a hinged gate 11. This gate 11 is substantially concavo-convex in cross section and is pivotally secured to the sides of the receptacle 8 by means of suitable pivot pins 12. This gate 11 is provided with a bottom 13, the bottom 13 carrying a depending opening pin 14. This pin 14 is adapted to be engaged by means of the tripping cams 15 which are carried by the dropper cups 16. The gate 11 is adapted to normally hang in a closed position for the purpose of preventing the potato from accidentally dropping from the receptacle 8.

A planter wheel 7 as above stated is carried upon the shaft 6 and comprises a plurality of radiating spokes 18 upon which spokes 18 are supported the dropper cups 16 by means of the planting members 19 as shown in Fig. 5. These cups 16 are so supported as to engage the tripping finger 14 and swing the gate 11 to an open position for the purpose of permitting a potato or portion thereof to drop from the receptacle into the upper end of the cups 16. Each of the cups 16 is provided with a tripping cam 15 as above stated, the pan being adapted to engage the tripping finger 14 for the purpose of opening the gate 11 when the cup 16 is directly under the receptacle 8 for the purpose of permitting a portion thereof to drop into the cup 16.

By considering Figs. 3 and 4 of the drawings, it will be seen that the dropper cup 16 is provided with an aperture 21 in the upper end thereof for receiving potatoes from the receptacle 8. This aperture 21 is normally closed by means of a hinged gate 20, the gate 20 being supporting upon suitable spring hinges 22 for the purpose of normally holding the gate 20 in a closed position. The gate 20 is provided with an aperture 23 formed therein, the aperture 23 being normally closed by means of a shutter 24. The shutter 24 is pivotally secured to the gate 20 by means of a pivot pin 25 and a spring 26 engages the shutter 24 and is also secured to the gate 20 for normally holding the shutter 24 in a closed position. The shutter 24 is provided with an operating arm 27, the operating arm 27 extending through an enlarged slot 28 formed in the side of the dropper cup 16. This arm 27 is shaped to provide a yoke portion 28' so as to extend around the spokes 18 and freely operate without being interfered with by the spokes 18. The arm 27 is provided with a projecting end or tip 29 which projecting end 29 extends to one side of the spokes 18 and is adapted to be engaged by means of the inwardly extending foot 30 of the tripping arm 31. This tripping arm 31 is supported upon the bearing 5 and hangs below the same directly under the vertically extending receptacle supporting arm 9, in this way permitting the shutter 24 to be opened and thereby allowing the potato which has been dropped into the dropper cup to be dropped out from the end of the cup and into the ground over which the wheel is passing.

The wheel 7 is preferably of such a size as to allow the potatoes to be dropped from the dropper cup 16 to drop approximately 16 or 18 inches apart. It should be understood that the wheel 7 is adapted to travel in the furrow formed by the plow which is adapted to support the same and by keeping the receptacle 8 full of potatoes, for planting, the potatoes will drop automatically into the cups 16 and be automatically dropped therefrom at predetermined intervals, depending upon the size of the wheel 7.

The operation of the device is as follows:

As the wheel 7 rotates, the cup 16 will be moved upwardly and the cam portion 15 will engage the tripping portion 14 and swing the gate 11 to an open position. The weight of the potato dropping upon the gate or door 20 will force the same inwardly and the potato will then drop into the cup 16. As the wheel continues to rotate, the tripping finger 30 will engage the projecting end 29 of the arm 27, thereby swinging the shutter 24 to an open position and opening the aperture 23, in this way permitting the potato which has been deposited within the cup 16 to be dropped therefrom. It should be understood that the potatoes are dropped into the receptacle or cup 16 at a point diametrically opposite the point of discharge, this being possible due to the arrangement of the arms 9 and 31.

From the foregoing description, it will be seen that a very simple and efficient device has been produced in the nature of a potato planter which may be very readily and quickly attached to the ordinary walking plow. In view of the fact that the arms 3 are connected to the clamps 2, it should be understood that the plow may be lifted from the ground without interfering with the planter.

It should be of course understood that certain obvious detail mechanical changes may be made in the present device without departing from the spirit of the invention, so long as these changes fall within the scope of the appended claims.

What is claimed is:

1. A planter device of the class described comprising a dropper wheel, a plurality of dropper devices carrier by said wheel and adapted to rotate therewith, each dropper device comprising a hinged door at one end thereof and adapted to receive seed from a discharging device operating therewith, a pivoted shutter carried by each door, and means for automatically swinging said pivoted shutter for permitting the seed to drop from said dropper devices.

2. A planter device of the class described comprising a wheel, a plurality of dropper cups carried by said wheel, each dropper cup provided with a hinged door at one end thereof, said door provided with an aperture formed therein, a shutter pivotally secured to said door, a spring for normally holding said door to a closed position, an operating arm extending through said cup and engaging said shutter, and means for engaging said arm and swinging said shutter to an open position for permitting seed to drop therefrom.

3. A planter device of the class described comprising a wheel, a plurality of dropper cups carried by said wheel, each dropper cup provided with a hinged door at one end thereof, said door provided with an aperture formed therein, a shutter pivotally secured to said door, a spring for normally holding said door to a closed position, an operating arm extending through said cup and engaging said shutter, and a spring for normally holding said shutter in a closed position.

4. A planter of the class described comprising a wheel, a bearing supporting said wheel, means for attaching said bearing in engagement with a support, a plurality of dropper cups carried by said wheel, a depositing reservoir supported above said wheel, a dropping gate pivotally secured to said reservoir and adapted to normally close the lower end thereof, a tripping finger carried by said gate, means carried by said dropper devices for engaging said tripping finger, and adapted to swing the same to an open position for permitting seed to drop therefrom, and means carried by said dropper devices for receiving seed discharged from said reservoir.

5. A planter of the class described comprising a wheel, a bearing supporting said wheel, means for attaching said bearing in engagement with a support, a plurality of dropper cups carried by said wheel, a depositing reservoir supported above said wheel, a dropping gate pivotally secured to said reservoir and adapted to normally close the lower end thereof, a tripping finger carried by said gate, and adapted to swing to an open position for permitting seed to drop therefrom, and tripping cams carried by the dropper cups and engaging said tripping finger for swinging said gate to an open position and means for automatically dropping seed from said dropper device at predetermined intervals.

6. A planter of the class described, comprising a wheel, a plurality of dropper cups carried by said wheel, a door hingedly secured to one end of each cup, a gate carried by each door adapted to be retained in a normally closed position, said door provided with a discharge aperture normally closed by means of said gate, a tripping finger carried by each gate and extending through said dropper cup, a tripping arm adapted to engage said first mentioned tripping arm, and means for dropping potatoes into said dropper cups.

7. A potato planter of the class described, comprising a wheel, a plurality of dropper cups carried by said wheel, a reservoir supported above said wheel and adapted to drop potatoes into said cups, a hinged gate carried by one end of each cup and adapted to permit the potatoes to drop therein, a sliding gate pivotally secured to said first mentioned gate, said first mentioned gate provided with a discharge aperture, formed therein adapted to be normally closed by said second mentioned gate, and means for automatically opening said first mentioned gate when said dropper device has reached a predetermined point.

8. A planter device of the class described comprising a dropper wheel, a plurality of dropper devices carried by said wheel and adapted to rotate therewith, each dropper device provided with a trap door at one end thereof and adapted to receive seed from a discharging device for operating therewith, a shutter carried by each dropper device, and means for automatically actuating said shutter for permitting the seed to drop from said dropper device.

9. Planter device of the class described comprising a dropper wheel, a plurality of dropper devices carried thereby, a reservoir supported above said wheel, means for normally closing the outer end of said dropper devices and adapted to permit seed to drop therein from said reservoir, means carried by said dropper devices and coöperating with said reservoir for opening said reservoir and permitting seed to drop into said dropper devices, and means for automatically opening said dropper devices at predetermined intervals for permitting seed to be dropped from said dropper devices.

In testimony whereof I affix my signature in presence of two witnesses.

VERNON G. NELSEN.

Witnesses:
J. L. JORGENSON,
J. A. SWANSON.

Copies of this patent may be obtained for five cents each, by addressing the "Commissioner of Patents, Washington, D. C."